(12) United States Patent
Spitaletta et al.

(10) Patent No.: US 6,332,074 B1
(45) Date of Patent: *Dec. 18, 2001

(54) NONREUSABLE CELLULAR TELEPHONE AND METHOD OF MAKING CELLULAR TELEPHONE CALLS

(76) Inventors: Robert E. Spitaletta, 16 Stonehouse Rd., Glen Ridge, NJ (US) 07028; Edward C. Spitaletta, 85 Main St., Hackensack, NJ (US) 07601

( * ) Notice: Subject to any disclaimer, the term of this patent is extended or adjusted under 35 U.S.C. 154(b) by 0 days.

This patent is subject to a terminal disclaimer.

(21) Appl. No.: 09/564,755

(22) Filed: May 4, 2000

Related U.S. Application Data

(63) Continuation of application No. 08/692,533, filed on Aug. 6, 1996
(60) Provisional application No. 60/009,541, filed on Dec. 29, 1995.

(51) Int. Cl.$^7$ .............................. H04M 11/00; H04M 1/66
(52) U.S. Cl. ............................... 455/407; 455/410
(58) Field of Search ................... 455/410, 407, 455/404

(56) References Cited

U.S. PATENT DOCUMENTS

| | | | |
|---|---|---|---|
| 4,020,325 | 4/1977 | Pfost et al. | 235/67.1 B |
| 4,110,966 | 9/1978 | Kashio | 58/4 A |
| 4,356,903 | 11/1982 | Lemelson et al. | 194/1 R |
| 4,711,993 | 12/1987 | Kosednar et al. | 235/380 |
| 4,736,461 | 4/1988 | Kawasaki et al. | 455/343 |
| 4,776,000 | 10/1988 | Parienti . | |
| 4,951,308 | 8/1990 | Bishop et al. . | |
| 4,965,821 | 10/1990 | Bishop et al. . | |
| 4,975,942 | 12/1990 | Zebryk . | |
| 5,109,401 | 4/1992 | Hattori et al. . | |
| 5,138,650 | 8/1992 | Stahl et al. . | |
| 5,164,923 | 11/1992 | Avis . | |
| 5,203,009 | 4/1993 | Bogusz et al. . | |
| 5,222,127 | 6/1993 | Fukui . | |
| 5,248,929 | 9/1993 | Burke | 320/48 |
| 5,361,297 | 11/1994 | Ortiz et al. | 455/407 |
| 5,365,570 | 11/1994 | Boubelik . | |
| 5,388,148 | 2/1995 | Seiderman | 455/409 |
| 5,438,612 | 8/1995 | Norimatsu | 379/111 |
| 5,461,664 | 10/1995 | Cappadona . | |
| 5,574,772 | 11/1996 | Scalisi et al. | 379/58 |
| 5,592,535 | 1/1997 | Klotz | 379/58 |
| 5,615,408 | 3/1997 | Johnson et al. . | |
| 5,631,947 | 5/1997 | Wittstein et al. | 455/409 |
| 5,815,807 | 9/1998 | Osami et al. | 455/410 |
| 5,845,218 | 12/1998 | Altschul | 455/565 |
| 5,875,393 | 2/1999 | Altschul et al. | 455/407 |
| 6,112,077 | * 8/2000 | Spitaletta et al. | 455/407 |
| 6,115,597 | * 9/2000 | Kroll et al. | 455/404 |

FOREIGN PATENT DOCUMENTS

| | | |
|---|---|---|
| 2 262 685A | 6/1993 | (GB) . |
| 2262685 | 6/1993 | (GB) . |
| 9603001 | 2/1996 | (WO) . |
| WO 96/03001 | 2/1996 | (WO) . |

OTHER PUBLICATIONS

Hello Direct, "Keep Your Flip Phone Powered 3 Different Ways. Your choice," p. 25, 4/96.
Mobile Office, Marketplace advertisement for "fully automated cellular vending machine", 3/93.

* cited by examiner

*Primary Examiner*—William Cumming
(74) *Attorney, Agent, or Firm*—Lerner, David, Littenberg, Krumholz & Mentlik, LLP

(57) ABSTRACT

A nonreusable cellular telephone includes a programmable timer for providing a predetermined period of calling time during which the cellular phone may be used for cellular communications. The amount of remaining calling time is monitored and the phone is disabled when the calling time has expired rending the phone inoperative so that it may be disposed of.

18 Claims, 4 Drawing Sheets

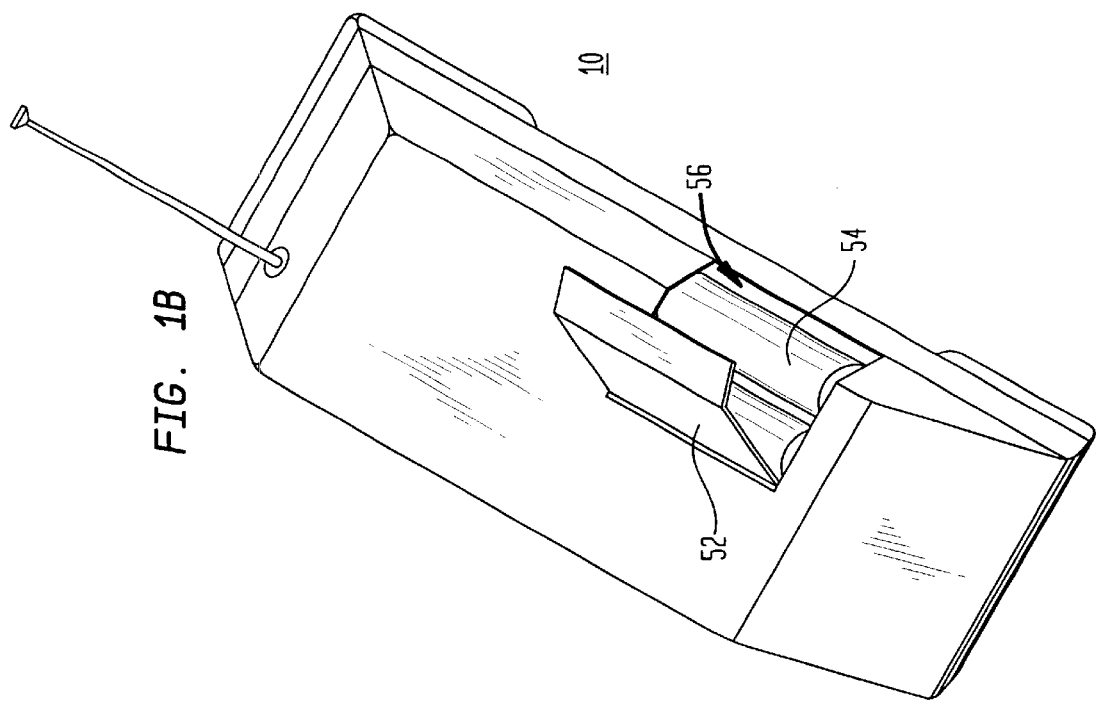
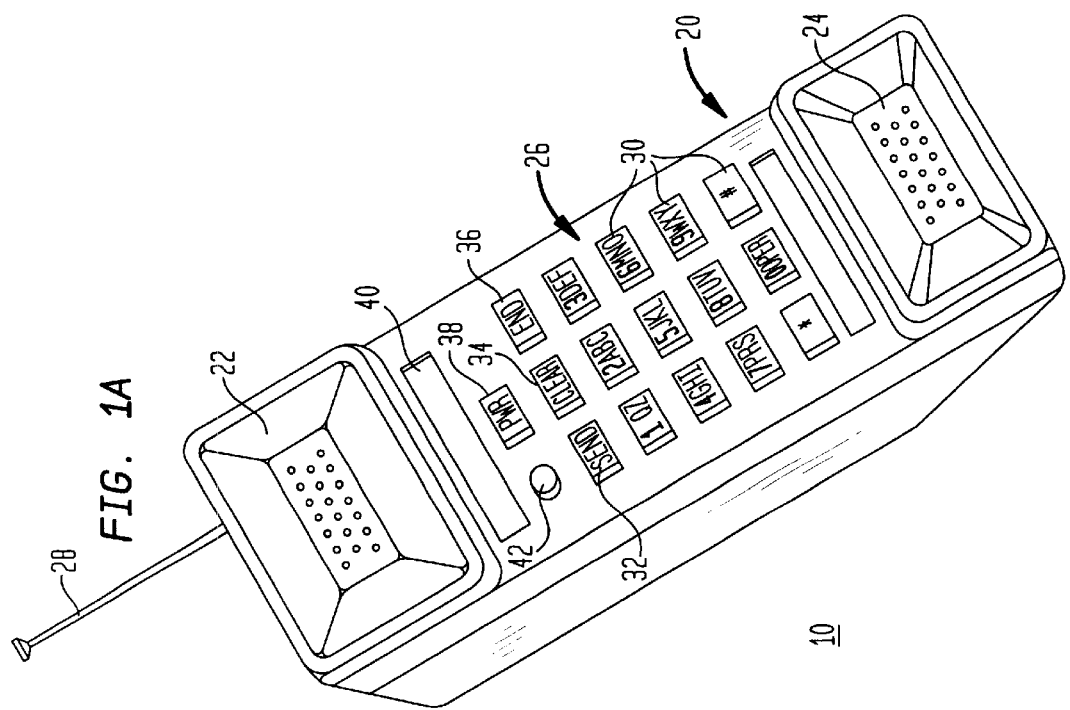

NONREUSABLE CELLULAR TELEPHONE AND METHOD OF MAKING CELLULAR TELEPHONE CALLS

CROSS-REFERENCE TO RELATED APPLICATION

This application is also a continuation of U.S. Application No. 08/692,533 filed on Aug. 6, 1996.

This application claims the benefit of U.S. Provisional Patent Application Ser. No. 60/009,541, the disclosure of which is incorporated herein by reference.

FIELD OF THE INVENTION

The present invention relates to cellular or wireless phones, and more particularly to cellular phones which are inexpensive and initially programmed with a predetermined period of calling time such that when the calling time has expired the cellular phone is rendered inoperable, nonreusable and can therefore be disposable.

BACKGROUND OF THE INVENTION

Cellular telephones have recently exploded onto the marketplace for a number of reasons such as availability of better cellular reception and more expansive coverage areas, lower prices, smaller phones and more competition. In our modem society, a car phone or a hand-held cellular phone which was once a luxury is now becoming a business and personal necessity. Still, while cellular phones are becoming more and more popular, the vast majority of individuals do not yet own cellular phones, due to in large part the high cost of the cellular calls and the monthly service fees charged by the cellular phone companies. While sometimes cellular phones are given away for free or little cost, to obtain the free phone a yearly service contract must typically be purchased which more than offsets the cost of the telephone for the phone company. The consumer, however, must now pay hundreds of dollars a year for the service contract.

Once the consumer decides to purchase a cellular telephone, a number of difficult decisions still must be made such as choosing the cellular provider and the particular calling plan. Once these choices are made, however, the consumer oftentimes must remain with the chosen provider for at least one year or else pay a steep severance penalty.

The costs of owning a cellular telephone also increase for the consumer when the costs for accessories for cellular phones are added up. Accessories such as AC adapters, car adapters, rechargeable batteries and battery charging units can add hundreds of dollars to the cost of owning a cellular phone.

There are a number of worries that the owner of a cellular phone must also face such as the possibility of theft of the cellular phone or theft of the phone number assigned to the cellular phone, which can then be used on other "cloned" cellular phones. If a cellular phone is stolen, a replacement phone is expensive and the phone number must be changed resulting in additional expenses and disruption of service. Cellular phone theft is also a large problem for the phone companies, which typically absorb the costs of illegally-made calls when a cellular phone or phone number is stolen. However, this ultimately results in higher rates that are passed on to the consumer.

If cellular phones were available that could overcome at least some of the above problems, more people of lesser means could have access to them. Therefore, to increase the accessibility of cellular phones to the general public there is a great need to overcome the many problems that exist today with cellular phones. This need is addressed by the present invention which, in addition to solving many of the above problems, provides new benefits not achievable with current cellular phones and cellular service providers.

The foregoing and other objects, features and various advantages of the present invention will be more readily apparent from the following detailed description of the preferred embodiments set forth below, taken in conjunction with the accompanying drawings.

SUMMARY OF THE INVENTION

One aspect of the present invention provides a nonreusable cellular phone having programmable timer means for providing a predetermined period of calling time during which the cellular phone may be used for cellular communications. The cellular phone further includes monitoring means for monitoring the time remaining of the calling time and disabling means for permanently disabling the cellular phone when the calling time has expired such that the cellular phone is rendered inoperative and may be disposed of Preferably, the cellular phone includes indicating means, such as a tone generator or LED for alerting the user of the cellular phone as to the status of remaining time of the calling time.

The monitoring means desirably includes rate means for calculating the remaining time of the calling time based upon the duration of a phone call multiplied by a rate factor determined by the phone number called on the cellular phone. The rate means may include a rate storage chip for storing a plurality of rate factors corresponding to area codes and dialing prefixes of possible phone numbers for calculating the remaining time of the calling time. The cellular phone can allow both incoming and outgoing calls or can be configured to allow only outgoing calls.

Preferably, the cellular phone is provided with only a limited number of keys on its keypad, and can therefore include a keypad consisting only of the number keys zero to nine, the pound key (#), the star key (*), a send key, a clear key, an end key and a power key. The cellular phone can include one or more non-rechargeable batteries for powering the cellular phone and indicating means for alerting the user of the cellular phone as to the status of remaining calling time.

Another aspect of the present invention provides a method of providing time-limited cellular communications comprising the steps of (a) providing to an end user a nonreusable cellular phone having a predetermined period of calling time during which the cellular phone may be used for cellular communications, the cellular phone including monitoring means for monitoring the time remaining of the calling time and disabling means for permanently disabling the cellular phone when the calling time has expired such that the cellular phone is rendered inoperative and may be disposed of; and (b) programming the cellular phone with the predetermined calling time before the step of providing the nonreusable phone to the end user whereby the cellular phone is provided to the user with limited, unextendable calling time.

The foregoing and other objects, features and various advantages of the present invention will be more readily apparent from the following detailed description of the preferred embodiments set forth below, taken in conjunction with the accompanying drawings.

BRIEF DESCRIPTION OF THE DRAWINGS

FIG. 1A is front perspective view of a nonreusable cellular phone in accordance with a preferred embodiment of the present invention.

FIG. 1B is a rear perspective view of the cellular phone shown in FIG. 1A.

DETAILED DESCRIPTION OF PREFERRED EMBODIMENTS

Figure 2:
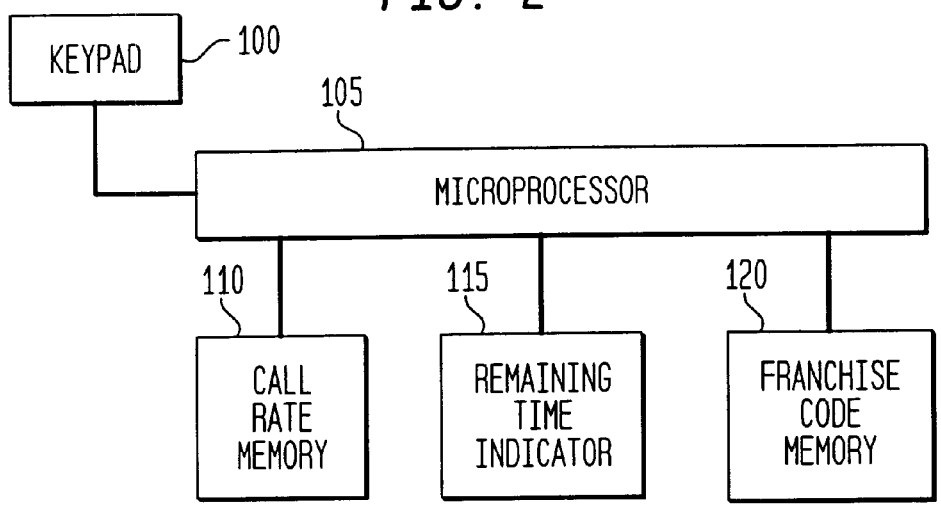
FIG. 2 is a block diagram of the main components of the cellular phone.
Figure 2A:
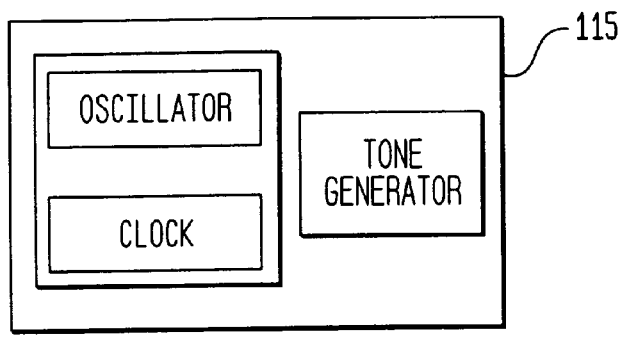
FIGS. 2A and 2B are block diagrams of alternative components of the cellular phone.
Figure 2B:
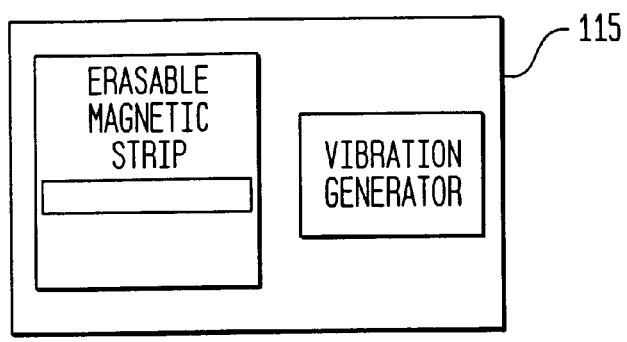

The basic principle behind the nonreusable cellular phone of the present invention is that the cellular phone is initially provided with a one-time, predetermined amount of calling time during which the user may conduct cellular communications, such as making calls or making and receiving calls. During cellular communications, the amount of time remaining of the calling time is monitored and when all of the calling time is consumed or spent, the cellular phone is rendered nonreusable. Thus, the cellular phone can then be disposed of by the user if so desired. The programming of the initial calling time occurs before the user is given the phone, such as at the factory which manufactures the phone or at a servicing center, and additional time may not be added by the user. Any tampering with the phone by the user to extend the calling time will result in the destruction of the electronics.

Referring now to FIGS. 1A and 1B, there is shown a nonreusable cellular phone 10 in accordance with a preferred embodiment of the present invention. Cellular phone 10 includes housing 20 which in turn includes speaker 22, microphone 24, key pad 26 and retractable antenna 28.

Key pad 26 includes the typical number keys 30, including keys 0 through 9, the star (*) key and the pound (#) key as provided on most telephones. Key pad 26 also includes a send key 32 for transmitting the dialed number, a clear key 34 for clearing numbers previously dialed, an end key 36 for ending the transmission, and a power key 38 for turning the cellular phone on and off. Preferably, only a limited number of keys, such as the keys shown in FIG. 1A are provided in order to reduce the cost of the cellular telephone by eliminating additional features found on more expensive cellular phones.

Cellular phone 10 may also include a LCD or LED display panel 40 which displays information such as the phone number dialed, power status, calling status and time remaining of the calling time. In order to reduce costs, however, display panel 40 can also be eliminated from the cellular phone 10.

Cellular phone 10 also includes an LED alert light 42 to alert the user when a given amount of time is remaining of the calling time. For instance, alert light 42 could illuminate when two minutes remain of the calling time. Alternatively, alert light 42 could flash at different rates to indicate time remaining such as by flashing at one speed when half of the calling time is remaining and at twice the speed when one-fourth of the calling time is remaining. Similarly, instead of a flashing LED, alert light 42 could be eliminated and replaced with a tone generator that generates one or more warning tones to indicate the remaining calling time. A vibration generator could also be used that vibrates the cellular phone in pulses or the like to indicate the remaining calling time.

Cellular phone 10 also includes a battery compartment 50 (FIG. 1B) which is closed by a battery cover 52 which is preferably hinged to housing 20 so as not to be removable. Low cost disposable batteries 54 such as conventional AA or 9 volt alkaline batteries can be used to provide the necessary power to the cellular phone. No complicated battery management software or high priced rechargeable batteries are necessary since the cellular phone will only operate for a limited amount of time where conventional disposable batteries will suffice.

To further reduce costs of the cellular phone, housing 20 is preferably formed from an inexpensive plastic and molded in one-piece. Housing 20 need not be especially sturdy or durable as the cellular phone is essentially disposable once the calling time is used up.

Referring now to FIG. 2, the basic components of the nonreusable cellular phone are shown, including key pad 100, microprocessor 105, call rate memory 110, remaining time indicator 115 and franchise code memory 120.

Microprocessor 105 controls the operation of the cellular telephone which is described in further detail below. Call rate memory 110 is an important feature of the present invention and is used to determine a standard rate deviation to account for the cost difference of calls made to different calling areas. For example, local calls (say within one area code) could deduct time from the calling time at one rate, such as $1 per minute, while long distance calls to another area code could deduct time at a different rate, such as $2 per minute. Call rate memory 110 is preferably an EPROM which is programmed with a plurality of rate factors based on the possible phone numbers dialed by the user. The rate factors can be based on area code alone or can be more detailed and be based on area code plus the three number dialing prefix for example.

Remaining time indicator 115 stores the amount of calling time which is programmed before the phone is provided to the customer. The programming of the calling time occurs only once and cannot be altered or tampered with by the user to gain additional calling time. Any attempts to tamper with the remaining time indicator will destroy the electronics and render the phone useless. To this end, the printed circuit boards can be encapsulated in a nondissolvable material preventing access to or tampering of the electronic components. Preferably, calling time intervals such as 30, 60 and 90 minutes are provided based on calls within a local calling area. Remaining time indicator 115 may comprise, for example, an erasable-only magnetic strip which is sequentially erased at the rate specified by microprocessor 105 in conjunction with the standard rate deviation selected from call rate memory 110. Remaining time indicator 115 may also comprise an oscillator circuit turned on during calls and turned off at the end of a call. The oscillator can drive a running clock whose binary output drives an LED to indicate time remaining or consumed. The counted time ultimately triggers a binary switch which shuts off the phone when a predetermined time frame is achieved thereby disarming the phone.

Franchise code memory 120 is provided to store the necessary information about the calling area in which the cellular phone is used. For example, franchise code memory 120 can store all of the communication codes necessary to access any given cellular system. Preferably, only those franchise codes of cellular providers from which bulk time has been contracted will be stored. Access to franchise codes not connected would not be accessible by this phone.

Figure 3:
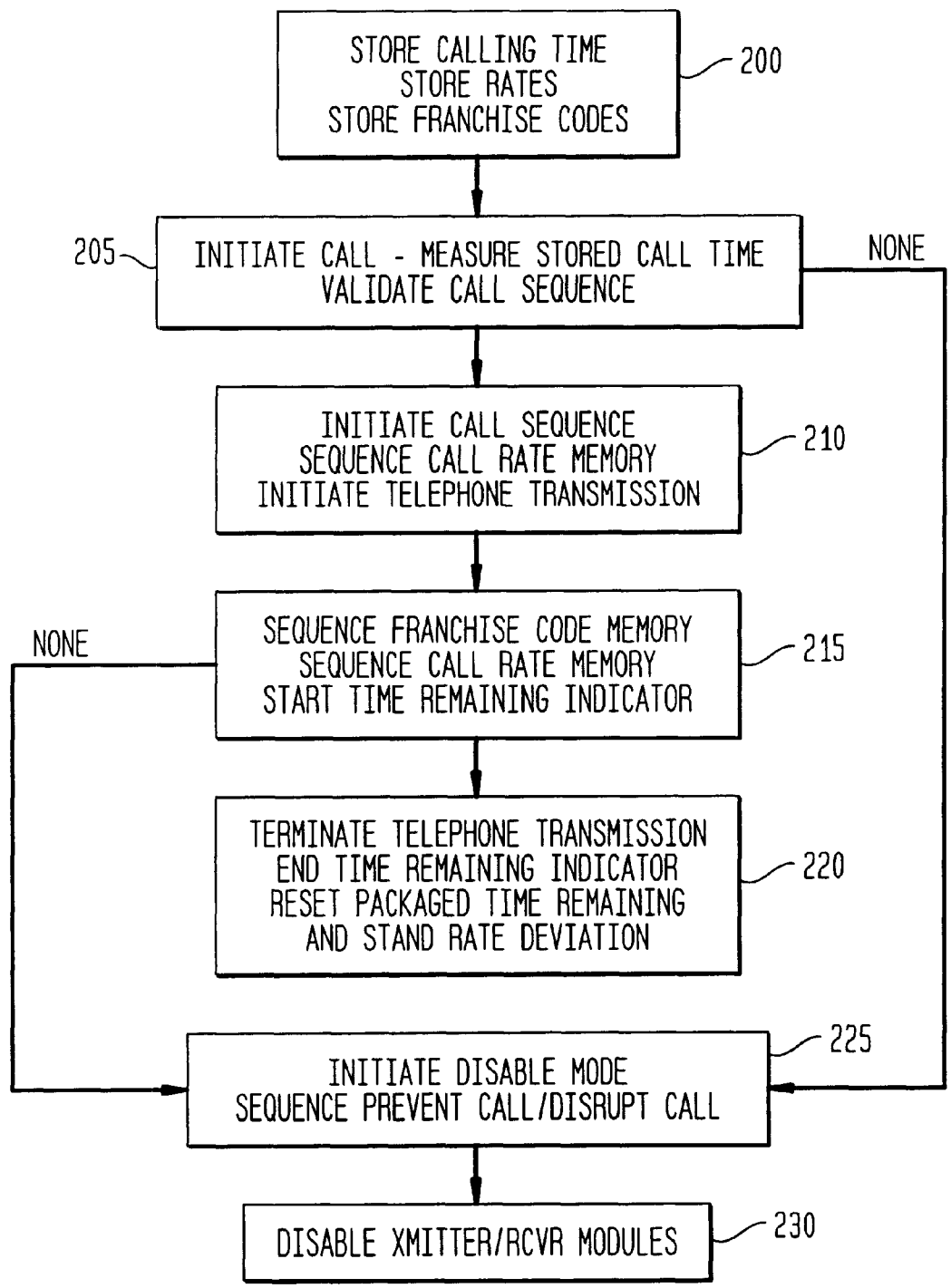
FIG. 3 is a flow chart illustrating the basic operation of the nonreusable cellular phone.

The basic operation of the nonreusable cellular phone is illustrated in the flow chart of FIG. 3. First, at step 200 the amount of calling time, calling rate factors and franchise codes are stored in memory. Next, at step 205 a call is initiated and the amount of remaining calling time is calculated. If there is remaining time left of the calling time, a validated call sequence step is initiated. If no calling time is left, the program jumps to step 225 which initiates a disable mode which will either prevent any new calls or disrupt any call in progress when the calling time has expired.

If there is remaining calling time, at step 210 the call sequence is initiated, the call rate memory is sequenced and the telephone transmission is initiated. Next, at step 215 the franchise code memory is sequenced, the call rate memory is sequenced and the time remaining indicator is started. If there is remaining time available, the phone will not be rendered inoperable and the phone call will be enabled by triggering the timer clock only after the call is connected or transmission is initiated. When the running oscillator is enabled the LED can be triggered to indicate time consumed or time remaining. The call rate memory is sequenced by selecting the rate at which the running oscillator is to oscillate thereby controlling how fast the clock must run to equate the cost of the call. If the time remaining indicator indicates that no time is remaining, the program jumps to step 225.

Once the call is complete, at step 220 the telephone transmission is terminated, the time remaining indicator is ended, and the calling time remaining and the standard rate deviation are reset. The oscillator will initially run at a local call rate but will be increased in rate by the amount preset by the call rates stored and selected by the area code, the first three digits and the franchise code. When no calling time remains, the program jumps to step 225 which initiates a disable mode to prevent any new calls and disrupt any current call when the calling time has expired. Finally, at step 230, the transmitter and receiver modules are disabled. The disable mode occurs when the clock runs to "0". A digital enable circuit will switch a voltage multiplier to disable the network of the transmit circuit preventing transmission.

Figure 4:
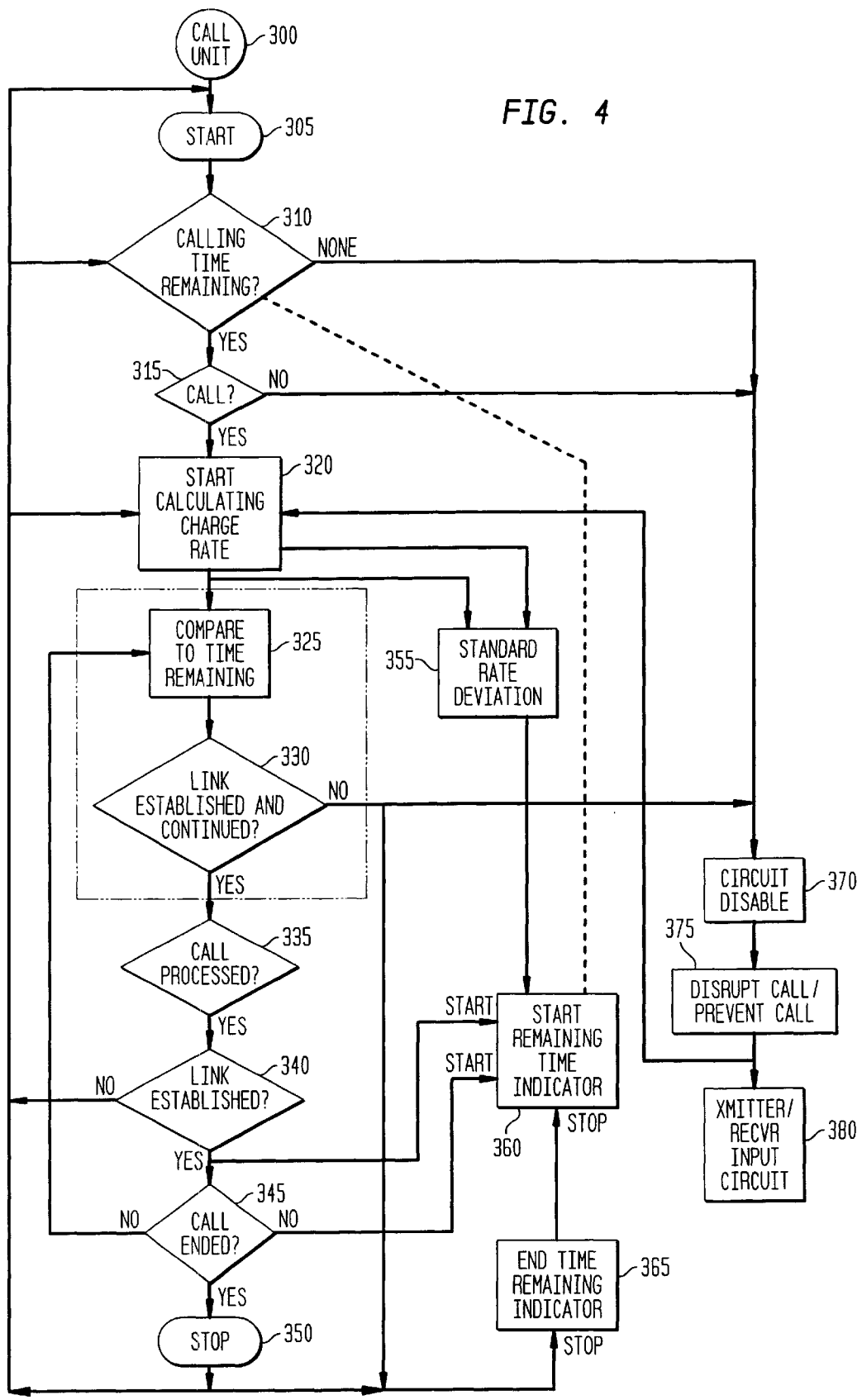
FIG. 4 is a flow chart illustrating the operation of the nonreusable cellular phone in greater detail.

Turning now to FIG. 4, the operation of the cellular phone is illustrated in more detail. First, at call unit step 300, the cellular phone is provided to the user with a preprogrammed amount of calling time. The user then turns on the power of the cellular phone at start step 305. Next, at step 310, the remaining amount of calling time is checked, and if there is calling time left, the cellular phone allows the user to dial a phone number to be called at step 315. If no calling time is remaining, the cellular phone is disabled at step 370 and at step 375 where any call in progress is disrupted and all future calls are prevented.

Once the phone number is dialed at step 320, the charge rate for the call is selected at step 320. In order to select the proper charge rate based on the number dialed, the standard rate deviation must be determined at step 355.

Next prior to the cellular communication, the remaining amount of calling time is checked at step 325 to determine whether the cellular phone will let the call go through. If there is calling time remaining, the link is then established at step 330. If necessary, at step 330 the proper franchise code can be selected for establishing the link. The call is then processed at step 335 and step 340 checks to see if the link is established during the call if the link is established, the remaining time indicator is then started at step 360 using the selected standard rate deviation. The remaining time indicator will continue to run until the call is ended or there is no remaining calling time.

At step 345, if the call is still proceeding, the amount of time remaining is checked at step 325. If the calling time is used up while the call is proceeding, step 330 does not allow the link to continue and forces the program to step 370 where the circuit is permanently disabled. When the call has ended at step 350, the remaining time indicator is also ended at step 365. If there is remaining calling time when the call is ended, the program is returned to start step 300 and the process is then repeated until all of the calling time is used up.

Preferably, the nonreusable cellular phone is limited to only making outgoing calls although it can be configured to receive incoming calls as well. For incoming calls, the calling time could also be used up based on the standard rate deviation associated with the incoming call's phone number. Besides the use of standard rate deviations for determining the rate at which time is used up from the calling time, other rate schemes are possible such as a flat rate not based on the number called or a rate based on the time of day the call is made. It is also possible that an incoming call could be given the lowest possible rate such that a user calling long distance could ask the person called to return the call. This scenario would be useful in the event a child is calling home and expects a long duration call.

A number of advantages are achieved by the present invention. For example, the user need not worry about choosing a cellular service provider and selecting a calling plan. The user simply makes calls from the cellular phone until the calling time has run out and then throws away the phone. The user does not receive phone bills and does not need to worry about monthly payments to a cellular service provider since the time is paid for by the supplier of the phone. Because there is only a limited amount of calling time available on the phone, the user does not need to worry about accessories to extend the power to the phone such as rechargeable batteries, AC adapters and battery charger units. The cellular phone can simply run off conventional disposable, non-rechargeable batteries. If the user loses the phone or the phone is stolen, the loss is only a limited amount of calling time as an unauthorized caller cannot extend the calling time past the time initially programmed on the phone.

A key advantage of the present invention is that is allows accessibility of cellular communications to those who could not afford the high prices of the phone and the monthly service fees. Instead of buying a permanent, multi-featured, durable cellular phone and then signing up for a yearly service contract, the user can purchase the low cost, disposable cellular phone of the present invention for a limited time period, such as 30 minutes, and simply throw out the phone when finished. The nonreusable phone can also serve as a second or third phone line when such a line is needed or the caller want to keep a particular line clear for incoming calls.

The low cost of the nonreusable cellular phone can be achieved by leaving out many features ordinarily found on full function cellular phones, such as programmable memory for storing multiple phone numbers, battery management software, power and data connector ports, expensive rechargeable batteries, and other lesser used keys such as volume control and recall. With the low cost of the cellular phone, it can be used in numerous environments and scenarios, such as on all school buses, in hospitals, senior citizens homes, etc. such that institutions can extend their emergency communications capabilities during power outage, fires, storms or the like. A spare phone can be kept in the glove compartment of a car as an emergency phone, or can be taken on camping trips or left in a boat. A parent can give the disposable cellular phone to a child without fear that the child could intentionally or accidentally run up an outrageous phone bill. The phone can also be resold with remaining time still available to any other user without permission or approval by the cellular provider. The phone can also be purchased as a gift for other unnamed individuals or for employees of a company. In this manner, the caller need not necessarily learn a PIN number, need not have a credit rating and can remain anonymous to the cellular service provider.

Although the invention herein has been described with reference to particular preferred embodiments, it is to be understood that such embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Moreover, it will be understood that it is intended that the present invention cover various combinations of the features described herein in addition to those specifically set forth in the appended claims.

What is claimed is:

1. A method of making a plurality of phone calls using a cellular phone which is nonresettable and permanently rendered inoperative after the expiration of a predetermined period of calling time, the cellular phone comprising a preprogrammed one-time predetermined period of calling time deductible from the cellular phone during cellular communications and a microprocessor operative to control the operation of the cellular phone, said method comprising:
   (a) conducting first cellular communications with the cellular phone for a limited duration less than said predetermined period of calling time;
   (b) automatically deducting a first amount of calling time from said predetermined period of calling time corresponding to the duration of said first cellular communications such that the user can make one or more additional calls without regard to when said first cellular communications was made and until said predetermined period of calling time is used up;
   (c) conducting additional cellular communications with the cellular phone;
   (d) automatically deducting an additional amount of calling time from said predetermined period of calling time corresponding to the duration of the additional cellular communications; and
   (e) repeating steps (c) and (d) until said predetermined period of calling time is used up and, at such time, permanently disabling the cellular phone such that it is permanently rendered inoperative and incapable of any further use.

2. The method of claim 1, further comprising sounding a tone generator to generate one or more tones to alert the user of the cellular phone as to the status of remaining calling time.

3. The method of claim 2, further comprising generating one or more tones upon expiration of a predetermined amount of calling time.

4. The method of claim 1, further comprising illuminating an LED upon expiration of a predetermined amount of calling time.

5. The method of claim 1, further comprising actuating a vibration generator to vibrate and alert the user as to the status of remaining calling time.

6. The method of claim 1, further comprising calculating the remaining time of the calling time based on a flat rate corresponding to the duration of the phone call.

7. A method of making a plurality of phone calls using a cellular phone which is rendered inoperative after the expiration of a predetermined period of calling time, the cellular phone comprising a preprogrammed one-time predetermined period of calling time deductible from the cellular phone during cellular communications and a microprocessor operative to control the operation of the cellular phone, said method comprising:
   (a) conducting first cellular communications with the cellular phone for a limited duration less than said predetermined period of calling time;
   (b) automatically deducting a first amount of calling time from said predetermined period of calling time corresponding to the duration of said first cellular communications such that the user can make one or more additional calls without regard to when said first cellular communications was made and until said predetermined period of calling time is used up;
   (c) conducting additional cellular communications with the cellular phone;
   (d) automatically deducting an additional amount of calling time from said predetermined period of calling time corresponding to the duration of the additional cellular communications; and
   (e) repeating steps (c) and (d) until said predetermined period of calling time is used up and, at such time, disposing of said cellular phone.

8. The method of claim 7, further comprising sounding a tone generator to generate one or more tones to alert the user of the cellular phone as to the status of remaining calling time.

9. The method of claim 7, further comprising generating one or more tones upon expiration of a predetermined amount of calling time.

10. The method of claim 7, further comprising illuminating an LED upon expiration of a predetermined amount of calling time.

11. The method of claim 7, further comprising actuating a vibration generator to vibrate and alert the user as to the status of remaining calling time.

12. The method of claim 7, further comprising calculating the remaining time of the calling time based on a flat rate corresponding to the duration of the phone call.

13. A method of making a plurality of phone calls using a cellular phone which is rendered inoperative after the expiration of a predetermined period of calling time, the cellular phone comprising a remaining time indicator providing a one-time predetermined period of calling time, a microprocessor operative to deduct calling time from said remaining time indicator and disable said cellular phone and send and end keys allowing the user to initiate and end cellular communications and to start and stop the deduction of the calling time, said method comprising:
   (a) conducting first cellular communications with the cellular phone for a limited duration less than said predetermined period of calling time in accordance with the operation of said send and end keys by the user;
   (b) automatically deducting a first amount of calling time from said predetermined period of calling time corresponding to the duration of said first cellular communications such that the user can make one or more additional calls without regard to when said first cellular communications was made and until said predetermined period of calling time is used up;

(c) conducting additional cellular communications with the cellular phone;

(d) automatically deducting a second amount of calling time from said predetermined period of calling time corresponding to the duration of the additional cellular communications; and (e) repeating steps (c) and (d) until said predetermined period of calling time is used up and, at such time, disposing of the phone.

14. The method of claim 13, further comprising sounding a tone generator to generate one or more tones to alert the use of the cellular phone as to the status of remaining calling time.

15. The method of claim 13, further comprising generating one or more tones upon expiration of a predetermined amount of calling time.

16. The method of claim 13, further comprising illuminating an LED upon expiration of a predetermined amount of calling time.

17. The method of claim 13, further comprising actuating a vibration generator to vibrate and alert the user as to the status of remaining calling time.

18. The method of claim 7, farther comprising calculating the remaining time of the calling time based on a flat rate corresponding to the duration of the phone call.

* * * * *

UNITED STATES PATENT AND TRADEMARK OFFICE
CERTIFICATE OF CORRECTION

PATENT NO. : 6,332,074 B1  
DATED : December 18, 2001  
INVENTOR(S) : Robert E. Spitaletta and Edward C. Splitaletta Page 1 of 1

It is certified that error appears in the above-identified patent and that said Letters Patent is hereby corrected as shown below:

<u>Title page,</u>  
Add [73] Assignee: "STX Corporation, West Palm Beach, FL (US)"  
Item [57], ABSTRACT,  
Line 6, "rending" should read -- rendering --.

<u>Column 1,</u>  
Lines 7 to 12, the Cross-References To Related Application section should read as follows:

"This application claim the benefit of U.S. Provisional Patent Application Ser. No. 60/009,541, the disclosure of which is incorporated herein by reference.

This application is also a continuation of U.S. Application No. 08/692,533 filed on Aug. 6, 1996."

<u>Column 1,</u>  
Line 27, "modem" should read -- modern --.

<u>Column 6,</u>  
Line 43, "is" should read -- it --.

Signed and Sealed this

Fifth Day of November, 2002

*Attest:*

JAMES E. ROGAN  
*Director of the United States Patent and Trademark Office*

*Attesting Officer*